US006988453B2

(12) United States Patent
Cole et al.

(10) Patent No.: US 6,988,453 B2
(45) Date of Patent: Jan. 24, 2006

(54) OUTLETS FOR A PYROLYTIC WASTE TREATMENT SYSTEM

(75) Inventors: Cameron Cole, Rainbow, CA (US); Raul de la Tores, Bell Gardens, CA (US); Toby L. Cole, Temecula, CA (US); Dan Watts, Surfside, CA (US)

(73) Assignee: International Environmental Solutions Corporation, Romoland, CA (US)

( * ) Notice: Subject to any disclaimer, the term of this patent is extended or adjusted under 35 U.S.C. 154(b) by 0 days.

(21) Appl. No.: 10/923,140

(22) Filed: Aug. 19, 2004

(65) Prior Publication Data

US 2005/0039655 A1 Feb. 24, 2005

Related U.S. Application Data

(60) Provisional application No. 60/497,397, filed on Aug. 21, 2003.

(51) Int. Cl.
*F23L 17/16* (2006.01)
*F23B 7/00* (2006.01)
*F23J 1/02* (2006.01)

(52) U.S. Cl. .................. 110/341; 110/161; 110/348; 110/171

(58) Field of Classification Search ............... 134/119, 134/120; 110/150, 161, 306, 297, 341, 348, 110/171
See application file for complete search history.

(56) References Cited

U.S. PATENT DOCUMENTS

| 4,036,608 A | 7/1977 | Gundzik et al. ............... 55/89 |
| 4,141,794 A * | 2/1979 | Choi ........................... 201/12 |
| 4,759,300 A | 7/1988 | Hansen et al. .............. 110/229 |
| 4,846,082 A * | 7/1989 | Marangoni .................... 110/234 |
| 5,653,183 A | 8/1997 | Hansen et al. .............. 110/346 |
| 5,868,085 A | 2/1999 | Hansen et al. .............. 110/346 |
| 6,619,214 B2 | 9/2003 | Walker ....................... 110/229 |

* cited by examiner

*Primary Examiner*—Kenneth Rinehart
(74) *Attorney, Agent, or Firm*—Rutan & Tucker, LLP

(57) ABSTRACT

The inventive subject matter is directed toward a pyrolytic waste treatment system comprising an outlet adapted to channel a composition out of a pyrolysis chamber. A mechanism is used for cleaning the outlet during operation of the pyrolytic system.

24 Claims, 1 Drawing Sheet

OUTLETS FOR A PYROLYTIC WASTE TREATMENT SYSTEM

This application claims the benefit of U.S. provisional application No. 60/497,397 filed on 21 Aug. 2003 incorporated herein by reference in its entirety

FIELD OF THE INVENTION

The field of the invention is pyrolytic waste treatment.

BACKGROUND OF THE INVENTION

Pyrolysis is a known method for treatment of waste. Examples of pyrolytic waste treatment systems can be found in U.S. Pat. Nos. 4,759,300, 5,653,183, 5,868,085, and 6,619,214. Unlike incineration, pyrolysis is the destructive decomposition of waste materials using indirect heat in the absence of oxygen. Burning wastes through incineration with direct flame in the presence of oxygen can be explosive, causing turbulence in the burning chamber, which fosters a recombination of released gases. Waste destruction in an oxygen-rich atmosphere makes conversion far less complete, is highly inefficient and creates harmful substances.

In contrast, the pyrolytic process employs high temperature in, most desirably, an atmosphere substantially free of oxygen (for example, in a practical vacuum), to convert the solid components of waste to a mixture of solids, liquids, and gases with proportions determined by operating temperature, pressure, oxygen content, and other conditions. The solid residue remaining after pyrolysis commonly is referred to as char. The vaporized product of pyrolysis is often further treated by a process promoting oxidation, which "cleans" the vapors to eliminate oils and other particulate matter there from, allowing the resultant gases then to be safely released to the atmosphere.

What has long been needed and heretofore has been unavailable is an improved pyrolytic waste treatment system that is highly efficient, is easy to maintain, is safe, reliable and capable of operation with a wide variety of compositions of waste materials, and that can be constructed and installed at relatively low cost. The thrust of the present invention is to provide such an improved pyrolytic waste treatment system.

SUMMARY OF THE INVENTION

The inventive subject matter is directed toward a pyrolytic waste treatment system comprising an outlet adapted to channel a composition out of a pyrolysis chamber, and a mechanism for cleaning the outlet during operation of the system.

Another aspect of the inventive subject matter is directed toward methods of treating waste using a pyrolysis system having at least one outlet for transferring a composition out of a pyrolysis chamber comprising cleaning the outlet while the composition is being transferred by the outlet.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
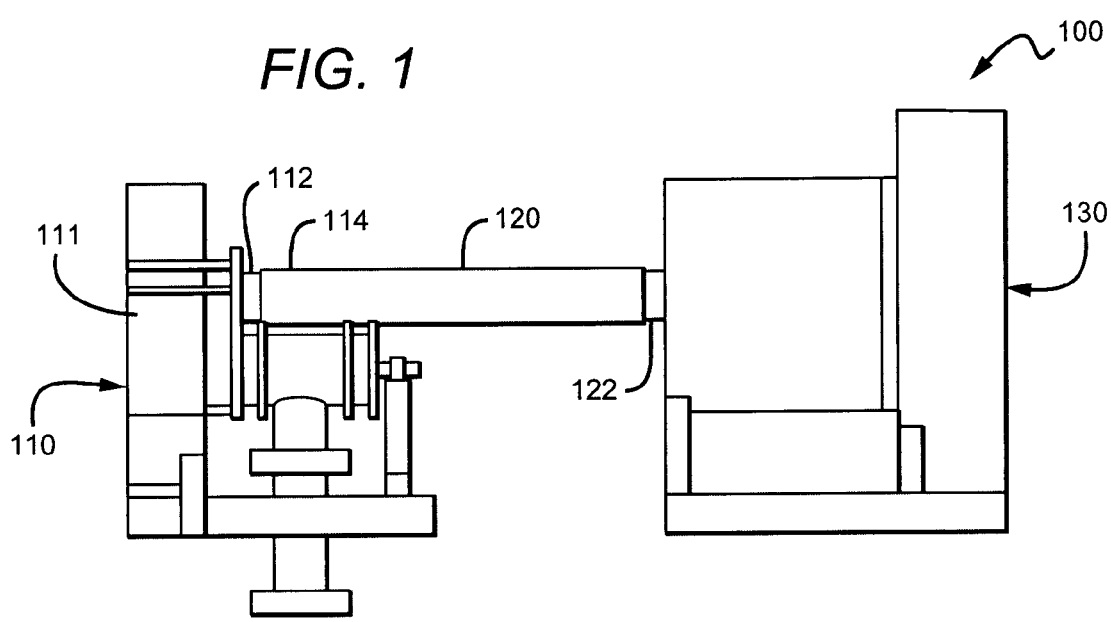
FIG. 1 is a schematic of a pyrolytic waste treatment system.

In FIG. 1, a pyrolytic system 100 generally comprises a pyrolytic converter 110 coupled to a thermal oxidizer 130 by an outlet 120.

Pyrolysis of waste produces gases the composition of which depends on the composition of the waste being treated. However, many of the gases produced have a tendency to form a solid residue as they cool. As such, outlets have a tendency to clog. Clogging of gas outlet lines can be prevented or minimized at least by preventing gasses from cooling in the lines, causing gasses to move more quickly through the lines, and dislodging any residue as it forms. One way to implement all three of these options is by injecting steam into gas outlet lines in a manner that helps move gas through the lines and helps dislodge any residue that forms.

Outlet 120 has gases enter it via vapor residue outlet 112. The system further comprises a steam injection port 114 used to inject high pressure steam into outlet 120.

Port 122 is preferably coupled to a source of steam where the steam is at least partially produced by waste heat from the pyrolysis subsystem. Such waste heat may come from the heating chamber of a pyrolysis subsystem after being used to heat the pyrolysis chamber, or may in some instances come at least partially from gases passing through the outlet 120 the steam is being injected into. Some systems may be adapted to use residual/waste heat for cogeneration with the steam used to clean the outlet being a byproduct of such cogeneration.

It is contemplated that steam may be introduced at different pressures in different embodiments, but it is contemplated that introducing steam at least Q psi where Q is 20, 90, or 120 is advantageous. In some instances it may be necessary to limit Q such that it is less than 125. Similarly, steam may be introduced at different temperatures in different embodiments, but it is contemplated that introducing steam at Y° F. where Y is 250 or 350 is advantageous.

Steam injection port 114 is one mechanism adapted for cleaning the outlet 120 during operation of the system, particularly while gasses are being generated within the pyrolysis chamber 111 and or while gasses are being channeled out of the chamber 111. In some embodiments cleaning may be performed continuously, while in other it may only be performed intermittently. Although steam is preferred for cleaning, other embodiments may utilize other fluids.

In preferred embodiments a cleaning mechanism will be adapted to inject fluid into the outlet line in a manner that facilitates movement of gasses out of the pyrolysis chamber through the outlet. In some instances this may involve injecting fluid into the outlet in a manner that causes the fluid to spiral around and through the outlet in a direction away from the pyrolysis chamber.

The means used for cleaning could vary and may involve the use of solids or fluids. It is contemplated that the use of steam would prove particularly beneficial as steam will often be a byproduct if waste heat is used in cogeneration. It is preferred that any heating of a cleansing solid or fluid result from use of waste heat such as heat generated in heating the pyrolysis chamber.

It is also contemplated that the manner in which a solid or fluid is injected may also prove advantageous, both in cleaning the outlet and moving gases through it. As such introducing steam such that it spirals along the length of the outlet could prove beneficial. If steam from cogeneration is used, it is contemplated that the steam will be introduced at a pressure of at least 20 psi, and more likely between 90 psi and 125 psi, and at a temperature of at least 250 degrees Fahrenheit, and more likely at approximately 350 degrees Fahrenheit.

The system shown in FIG. 1 embodies a method of treating waste using a pyrolysis system having at least one outlet line for transferring a composition out of a pyrolysis chamber comprising cleaning the outlet while compositions are being transferred by the outlet. Methods further comprise cleaning the outlet by injecting steam into the outlet. The steam is injected in a direction at least partially along the length of the line, in a direction at least partially away from the pyrolysis chamber, the steam is injected in a direction at least partially tangential to a center axis of the line at the point of injection, and wherein the steam is injected at two separate points.

Char is a solid residue, possibly mixed with any liquid residue that is not mixed with residue gasses. As with gas outlets, pyrolysis chamber char outlets (those used to direct the movement of char leaving the chamber) also have a tendency to clog. In addition, the high temperature of char exiting a pyrolysis chamber can be problematic as can the tendency of char to clump, and the possibility stored char fueling a fire or producing dust. As such, it is contemplated that injecting fluids or solids into a char line may prove beneficial, particularly if the solids and/or fluids act as a coolant, anti-clumping agent, a fire suppression agent, and/ or a dust suppressant.

Figure 2A:
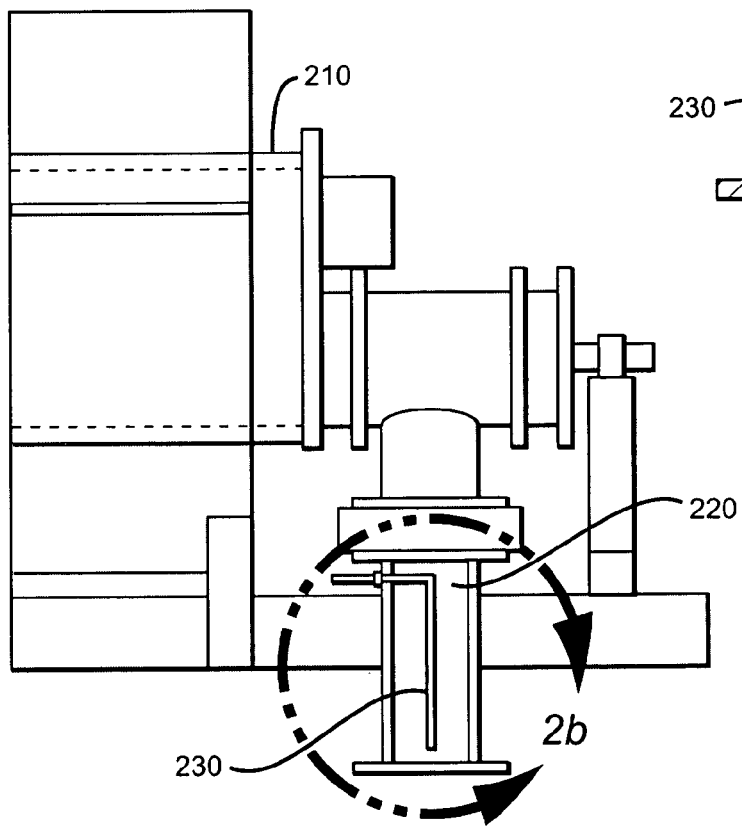
FIG. 2A is a cutaway view of a char output assembly.
Figure 2B:
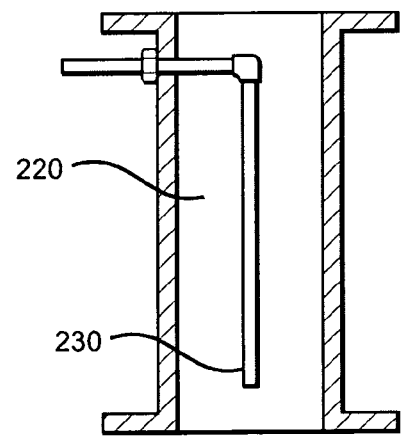
FIG. 2B is a detail view of the assembly of FIG. 2A.

In FIGS. 2a and 2b, a pyrolysis chamber 210 has an outlet 220. Within outlet 220 is an additive delivery mechanism 230. Mechanism 230 is a perforated pipe coupled to a fluid source where the perforations allow a fluid from the fluid source to be added to char leaving chamber 210 via line 220. Mechanism/pipe 230 is positioned within the char line 220 and extends along a portion of the length of the char line 220. It is preferred that mechanism 230 be coupled to a steam source as steam can function as a coolant, anti-clumping agent, a fire suppression agent, and a dust suppressant.

The system of FIG. 2 embodies a method of treating waste using a pyrolysis system having at least one outlet for transferring solids out of a pyrolysis chamber comprising injecting a fluid or solid other than char into any char being transferred out of the chamber, wherein the injected fluid or solid comprises at least one of: a coolant, an anti-clumping agent, a fire suppression agent, and a dust suppressant, wherein the injected fluid or solid is steam, and wherein the char outlet is coupled to an elongated char outlet line, and injecting the steam comprises forcing the steam into a distribution line positioned within and extending along a portion of the length of the char outlet line. Moreover, the embodied method comprises using a distribution line having a plurality of openings such that steam forced into the distribution line exits the line via such openings and enters the char outlet line.

Thus, specific embodiments and applications of a pyrolytic system have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A pyrolytic waste treatment system comprising an outlet adapted to channel a composition out of a pyrolysis chamber, and a mechanism for cleaning the outlet during operation of the system, wherein the mechanism is adapted to utilize steam to clean the outlet.

2. The system of claim 1, wherein the composition is a gas.

3. The system of claim 1, wherein the composition is a char.

4. The system of claim 1, wherein the mechanism is adapted to clean the outlet while gasses are being generated within the chamber and or while gasses are being channeled out of the chamber.

5. The system of claim 1, wherein the mechanism is adapted to clean the outlet while char is being generated within the chamber and or while char is being channeled out of the chamber.

6. The system of claim 1, wherein the cleaning mechanism is adapted to clean the outlet intermittently.

7. The system of claim 1, wherein heat generated to heat the pyrolysis chamber is used to generate the steam.

8. The system of claim 1, adapted to use waste heat for cogeneration and the steam used to clean the outlet is a byproduct of such cogeneration.

9. The system of claim 1, wherein the cleaning mechanism is adapted to inject fluid into the outlet in a manner that facilitates movement of gasses out of the pyrolysis chamber through the outlet.

10. The system of claim 1, wherein steam is introduced into the outlet at a pressure of at least X psi where X is 20.

11. The system of claim 10, wherein X is 90.

12. The system of claim 10, wherein X is less then 125.

13. The system of claim 1, wherein steam is introduced into the outlet at a temperature of at least Y degrees Fahrenheit where Y is 250 or 350.

14. The system of claim 1, wherein the mechanism for cleaning the outlet is coupled to a source of at least one of: a coolant, an anti-clumping agent, a fire suppression agent, and a dust suppressant.

15. The system of claim 1, wherein the mechanism for cleaning the outlet comprises a perforated pipe positioned within the outlet and extending along at least a portion of the length of the outlet.

16. A method of treating waste using a pyrolysis system having at least one outlet for transferring a composition out of a pyrolysis chamber comprising cleaning the outlet while the composition is being transferred by the outlet by injecting steam into the outlet.

17. The method of claim 16, wherein the steam is injected in a direction at least partially away from the pyrolysis chamber.

18. The method of claim 16, wherein the steam is injected in a direction at least partially tangential to a center axis of a point of injection.

19. The method of claim 16, wherein the steam is injected at at least two separate points.

20. The method of claim 16, wherein the step of cleaning the outlet further comprises injecting a fluid or solid other than char into any char being transferred out of the chamber.

21. The method of claim 20, wherein the injected fluid or solid comprises at least one of: a coolant, an anti-clumping agent, a fire suppression agent, an anti-oxidation agent, and a dust suppressant.

22. The method of claim 20 wherein the injected fluid is steam.

23. The method of claim 20, wherein the outlet is coupled to an elongated char outlet line, and injecting the fluid or solid comprises forcing the steam into a distribution line positioned within and extending along a portion of the length of the char outlet line.

24. The method of claim 23 wherein the distribution line comprises a plurality of openings such that steam forced into the distribution line exits the line via such openings and enters the char outlet line.

* * * * *